United States Patent Office.

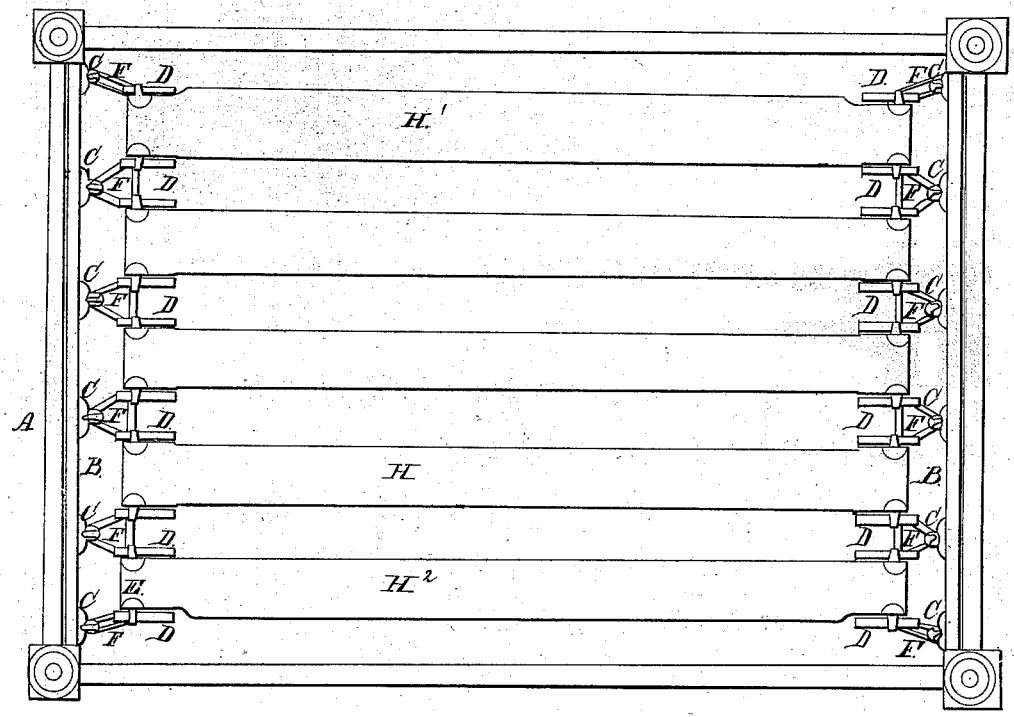

JOHN LYNN AND JACKSON R. CROWELL, OF SENECA FALLS, NEW YORK.

IMPROVED BED-BOTTOM.

Specification forming part of Letters Patent No. 54,567, dated May 8, 1866.

*To all whom it may concern:*

Be it known that we, JOHN LYNN and JACKSON R. CROWELL, of Seneca Falls, in the county of Seneca and State of New York, have invented a new and useful Improvement in Bed-Bottoms; and we do hereby declare that the following is a full, clear, and exact description of the construction and operation of the same, reference being had to the annexed drawings, making a part of this specification, in which—

Figure 1 is a bird's-eye of the whole bottom. Fig. 2 is a view of the slat and its attachments. Fig. 3 is a view of one of the elastic bands.

The letters of reference refer to the same parts in each figure.

A is the bedstead. It may be made in any ordinary method, with each end made to have the hooks fastened to them, as shown in Figs. 1 and 2.

B and B are pieces of board fastened to the inner ends of the bedstead, to which the hooks C are fastened.

C is one of a series of hooks that are fastened to the inner ends of the bedstead, as shown in Figs. 1 and 2. They are securely fastened with screws, and their use is to hold the bands F.

D is one of a series of double or reversible hooks. They are fastened to the edge of the slats H by means of screws and clasps F at the end and edge of the slats; the clasp prevents them from turning around by means of a pin or projection. (Shown in Fig. 2.) These hooks will hold to the bands when either side of the slat is up, as when a slat becomes bent down in the middle it may, by means of these hooks, be turned over and held the same as before.

E is one of a series of clasps that are fastened to each end of the slats. They are fastened by means of projections that extend out upon the upper and lower surface of the slats and the screw that holds the hooks, which pass through each of them, as shown in Fig. 2. These clasps have a projection that serves to hold the hooks D and prevent them being turned entirely around; but their position may be changed, as shown by the dotted lines in Fig. 2.

F is one of a series of elastic bands. They may be made of india-rubber, in shape as a ring, as shown in Fig. 3; or any other shape may do as well, for when properly applied they will conform to the parts, as shown in Fig. 1. They are put on the hook C and receive the hooks D, as shown in Figs. 1 and 2.

The hooks D, that hook into each band, are two in number, one of which is fastened to one slat and the other to another slat, thus connecting the slats together, so that when stress is applied to one they will all be effected by it; but the more remote from the stress the less effect, thus making the whole bottom united and causing several bands to support the weight, and thus keep the slats together as they were placed.

G is a shield to prevent the bed being worn by coming in contact with the hooks C. It also prevents the band F from being unhooked when any of the slats are being turned over. There is one at each end of the bedstead, and they are placed as shown in Fig. 2, and fastened to the top edge of the piece B.

H is one of a series of slats. The number may be according to the width of bedstead or width of slat preferred. Their length must correspond to the length of bedstead, and have the bands F in the proper position to have the necessary strength and proper elasticity. The two slats $H'$ and $H^2$ are the sides of the bottom. They are made wider than the others, and have their ends made narrow, as shown in Fig. 1, so that their edge may come near to the bedstead; and when these slats require to be turned over it may be done by changing ends of either or changing one to the place of the other. These slats are thus made to make the space between the bottom and the bedstead as small as is desirable to prevent bedding passing through the space.

Having thus described our invention, we claim—

The combination of the hook C, double hook D, clasp E, elastic band F, and shield G, when made substantially as specified, and applied as herein set forth.

JOHN LYNN.
JACKSON R. CROWELL.

Witnesses:
ALEX. M. DEAN,
A. P. CROWELL.